(12) United States Patent
Battistella et al.

(10) Patent No.: US 7,370,917 B2
(45) Date of Patent: May 13, 2008

(54) BRAKING SYSTEM FOR A TRAILER VEHICLE

(75) Inventors: Denis Battistella, Paderno Dugnano (IT); Martin Mederer, München (DE)

(73) Assignee: Knorr-Bremse Sistemi per Autoveicoli Commerciali, Arcore (Milan) (IT)

( * ) Notice: Subject to any disclaimer, the term of this patent is extended or adjusted under 35 U.S.C. 154(b) by 124 days.

(21) Appl. No.: 10/499,013

(22) PCT Filed: Dec. 18, 2002

(86) PCT No.: PCT/EP02/14471

§ 371 (c)(1),
(2), (4) Date: Jul. 28, 2005

(87) PCT Pub. No.: WO03/053758

PCT Pub. Date: Jul. 3, 2003

(65) Prior Publication Data

US 2006/0175894 A1    Aug. 10, 2006

(30) Foreign Application Priority Data

Dec. 21, 2001   (IT) ................... TO2001A1201

(51) Int. Cl.
*B60T 13/74* (2006.01)

(52) U.S. Cl. ............... 303/7; 303/118.1; 303/123
(58) Field of Classification Search ............ 303/118.1, 303/7, 3, 123, 127
See application file for complete search history.

(56) References Cited

U.S. PATENT DOCUMENTS

| | | | | |
|---|---|---|---|---|
| 4,861,115 A | * | 8/1989 | Petersen | 303/15 |
| 5,718,486 A | * | 2/1998 | Vollmer et al. | 303/3 |
| 7,020,551 B2 | * | 3/2006 | Goebels et al. | 701/38 |

FOREIGN PATENT DOCUMENTS

| | | | | |
|---|---|---|---|---|
| DE | 2500219 A | * | 7/1976 | |
| GB | 2270130 A | * | 3/1994 | |

* cited by examiner

*Primary Examiner*—Bradley King
(74) *Attorney, Agent, or Firm*—Sughrue Mion, PLLC

(57) ABSTRACT

An electro-pneumatic system including relay valves disposed between a pressure supply inlet and outputs respectively, and having respective control inputs; associated solenoid-operated valves each operable in a first or a second condition respectively to allow or prevent connection of the control input of the relay valves respectively to a pneumatic duct; a solenoid-operated commutation valve having respective first and second conditions in which it connects the pneumatic duct to the control input of the system to receive a braking control pressure or to an inlet/outlet aperture of a second solenoid-operated switching valve; and an electronic control unit (ECU) arranged to control the solenoid valves. The second switching valve has respective first and second conditions in which its inlet/outlet aperture is connected to a discharge passage opening to the outside environment or to the supply inlet.

3 Claims, 1 Drawing Sheet

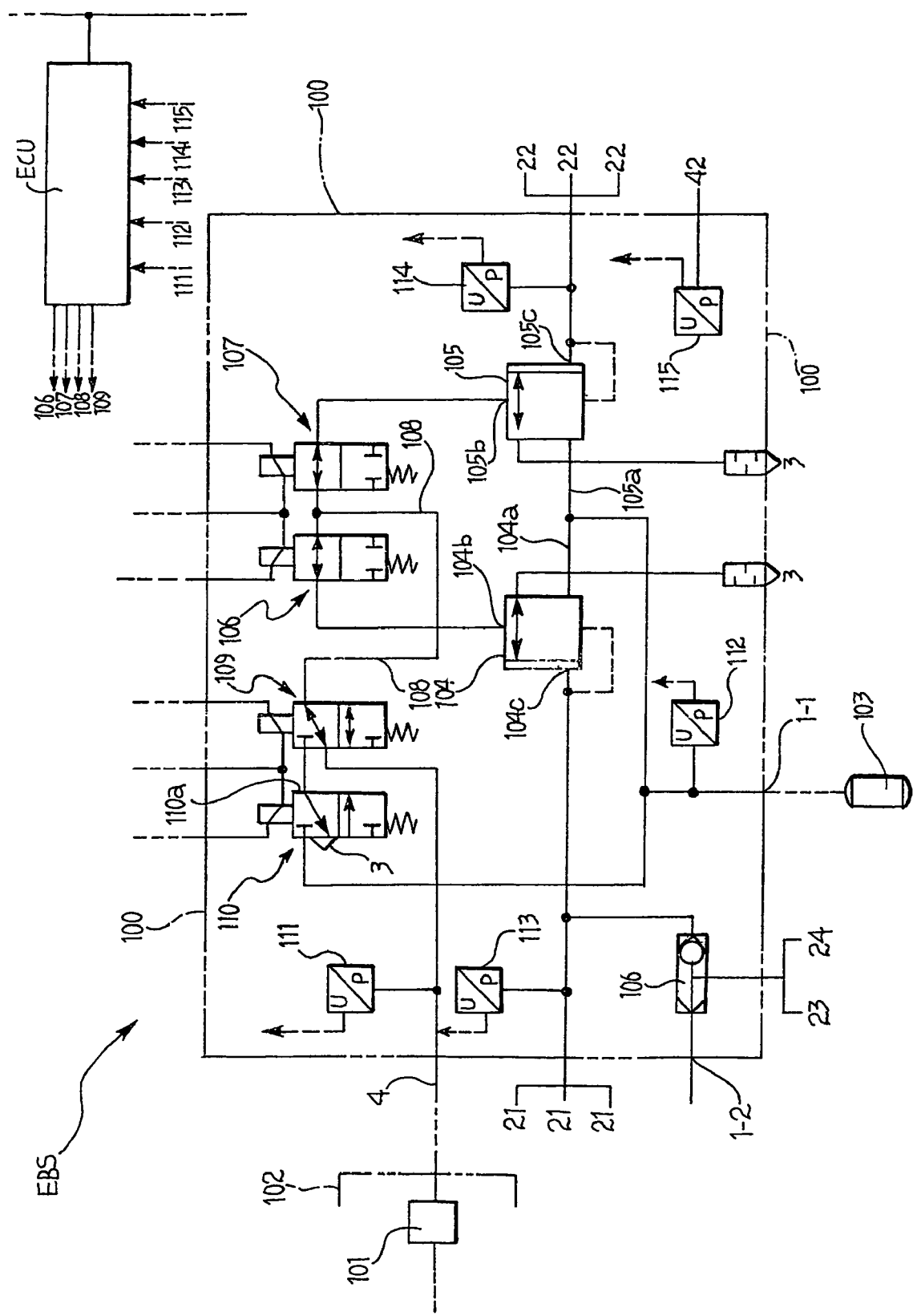

BRAKING SYSTEM FOR A TRAILER VEHICLE

The present invention relates to a braking system for a trailer vehicle.

More specifically, the invention relates to a braking system for a trailer vehicle which comprises an electro-pneumatic system including a pair of relay valves for applying braking pressure to the braking elements associated with the left and right hand respectively of the trailer, a plurality of solenoid valves, selectively operable to control the relay valves, and an electronic control unit for controlling the said solenoid valves in accordance with predetermined modes of operation.

One object of the present invention is to provide a braking system of the aforesaid type which is very simple and requires fewer solenoid valves than prior art systems to control the relay valves associated with the braking elements or brake actuators.

This and other objects are achieved according to the invention by providing a braking system the main characteristics of which are claimed in the appended Claim 1.

Further characteristics and advantages of the invention will become apparent from the detailed description which follows, provided purely by way of non-limitative example, with reference to the appended drawing, which is an electro-pneumatic circuit diagram for a system according to the invention.

In FIG. 1, a braking system for a trailer according to the invention is generally indicated EBS.

The system EBS comprises an electro-pneumatic braking system, generally indicated 100 and an associated electronic control unit, indicated ECU.

In the following description of the electro-pneumatic system 100, reference numerals are mostly greater than 100, while certain parts, and in particular certain connectors, have been given reference numbers less than 100, corresponding to the numbers conventionally used in the art for connectors for pneumatic brake systems.

The electro-pneumatic system 100 is provided for installation on a trailer vehicle and has a control input 4 for receiving brake control pressure from a valve for controlling braking of the trailer vehicle 101, installed in the tractor vehicle 102 to which the trailer is attached. The pressure applied in operation to the input 4 of the system 100 indicates the desired braking pressure to be applied to the pneumatic braking elements of the trailer.

The system 100 also has a pressure inlet 1-1 for connection to a pressure source 103 provided in the trailer, such as a pressure tank.

The system 101 also has first and second outputs 21 and 22 for connection to the pneumatic braking elements (known per se and not shown in the drawing) associated with the wheels on the left and right side respectively of the trailer.

The electro-pneumatic braking system 100 includes first and second relay valves 104 and 105, having respective supply connectors 104a and 105a both connected to the supply inlet 1-1 of the system.

The relay valves 104 and 105 have respective control inputs 104b and 105b and respective outlets 104c and 105c connected to the output 21 and the output 22 respectively of the electro-pneumatic system 100.

First and second solenoid-operated on/off valves are indicated 106 and 107 respectively in the drawing, and are associated respectively with the first and second relay valves 104 and 105. These solenoid valves are of a one-way, two-position type and can assume a first condition (shown in FIG. 1) in which they can allow the control inputs 104b and 105b respectively of the relay valves 104 and 105 to be connected to a (single) pneumatic duct 108.

The solenoid-operated on/off valves 106 and 107 also have a second condition or position, in which they cut off the said control inputs 104b and 105b of the relay valves 104 and 105 from the duct 108.

The control windings of the solenoid valves 106 and 107 are connected to corresponding outputs of the electrical control unit ECU.

Two solenoid-operated commutation valves are indicated 109 and 110. In the embodiment illustrated, these solenoid valves are of a three-way, two-position type.

The solenoid valve 109 has a first position or condition (shown in FIG. 1) in which it connects the pneumatic duct 108 with the control input 4 of the electro-pneumatic braking system 100. It can commute to a second condition or position in which it connects the pneumatic duct 108 with an inlet/outlet aperture 110a of the solenoid-operated commutation valve 110. This latter has a first position (illustrated) in which is connects the said inlet/outlet aperture 110a to a discharge passage 3 opening into the outside environment. In its second position (not shown), the solenoid-operated commutation valve 110 connects the supply inlet 1-1 with its own inlet/outlet aperture 110a and thus with the solenoid valve 109.

The control windings of the solenoid valves 109 and 110 are also controlled by the electronic control unit ECU.

Two electrical pressure transducers, indicated 111 and 112 are provided to emit electrical signals indicating the pressure at the control input 4 and at the switching inlet 1-1 of the electro-pneumatic system 100.

Additional pressure transducers 113 and 114 are associated with the outputs 21 and 22 of this electro-pneumatic system.

Finally, a further pressure transducer 115 is provided to emit electrical signals indicating the load condition of the trailer. This transducer may, for example be associated with the suspension of the trailer.

The pressure transducers 111-115 are connected to corresponding inputs of the electronic control unit ECU.

In the embodiment illustrated, the electro-pneumatic system 100 has an additional inlet indicated 1-2. This inlet is provided for connection to an emergency valve for normally receiving pressure from this latter. The inlet 1-2 is connected to the output 104c of the relay valve 104 by means of a double non-return valve 116 connected to outputs 23 and 24 which are intended to be connected to spring operated braking means (known per se and therefore not shown) of the trailer vehicle.

In operation, with the electro-pneumatic system in the condition shown in the drawing, brake-control pressure arriving at the input 4 of the system 100 reaches the control inputs 104b and 105b of the relay valves 104 and 105 via the solenoid-operated commutation valve 109 and the solenoid-operated on/off valves 106 and 107. The relay valves 104 and 105 apply a braking pressure to the braking elements connected to the outputs 21 and 22 of the system 100 which corresponds to the degree of pressure applied to the control input 4 of the system.

The control unit ECU measures the pressure values signalled by the sensors 111-115.

The unit ECU is set to cause an increase in pressure, when necessary, to the control input of one or both of the relay valves 104 and 105.

In order to increase pressure at the control input of the relay valve 104, for example, the unit ECU controls the solenoid valves 106, 110 to adopt an operating condition in which both solenoid-operated commutation valves 109 and 110 are in their aforesaid second positions (that is the position not illustrated in FIG. 1), while the solenoid-operated on/off valve 106 associated with the relay valve 104 is in the condition shown in the drawing, and the other on/off valve 107 is in the condition in which it disconnects the relay valve 105 from the pneumatic duct 108. In this condition, the pressure inlet 1-1 is connected to the control input 104b of the relay valve 104, by means of the solenoid valves 109 and 110, the pneumatic duct 108 and the solenoid valve 106. This makes it possible to increase braking pressure to the output 21 of the electro-pneumatic system 100.

Once the desired pressure is reached at the output 21 (measured by the transducer 113), the control unit ECU controls the on/off valve 106 to commute, disconnecting the control input 104b of the relay valve 104 from the pressure supply inlet 1-1.

In order to control a pressure increase to both outputs 21 and 22, the unit ECU controls the solenoid valves 106-110 as described above, except that this time the solenoid valve 107 is also kept in the first, illustrated, position, thereby allowing the control input 105b of the relay valve 105 also to be connected to the pressure inlet 1-1 of the electro-pneumatic system. Once the desired braking pressure is reached, both solenoid valves 106 and 107 are commuted.

In a manner similar to that described above, the unit ECU is conveniently arranged to be able, when desirable or necessary, to control a decrease in pressure applied to the control input of one or both of the relay valves 104 and 105.

Thus, for example, if a decrease in pressure is required at the control input 104b of the relay valve 104, the unit ECU controls the solenoid valves 106-110 so as to adopt an operating condition in which the solenoid valve 109 is in the second condition described earlier (that it the one not shown in the drawing), the solenoid valves 106 and 110 are in the condition shown in the drawing, while the solenoid valve 107 is in the condition which is not shown.

In this condition, the control input 104b of the relay valve 104 is in communication with the outside environment via the solenoid valve 106, the pneumatic duct 108, the solenoid valve 109, the inlet/outlet aperture 110a and the exhaust passage 3 of the solenoid valve 110. Once the braking pressure 21 has dropped to the desired value, the unit ECU causes the solenoid valve 106 to commute.

In a similar manner to that described above, the unit ECU can cause a controlled decrease in pressure to the control inputs of both the relay valves 104 and 105.

The system described above is not however able to increase pressure applied to the control input of one relay valve while simultaneously decreasing pressure to the control input of the other relay valve. Should such an operation be necessary, the system described above would require the two operations to be carried out in sequence, with the second being carried out after a delay corresponding to the time required to complete the first.

This disadvantage is more than compensated for, however, by the remarkable simplicity of construction of the electro-pneumatic system 100 described above and, in particular, by the reduced number of solenoid valves it requires, as well as by the simplicity with which the unit ECU can control these valves.

Naturally, the principle of the invention remaining unchanged, embodiments and manufacturing details may vary widely from those described and illustrated purely by way of non-limitative example, without departing thereby from the scope of the invention, as claimed in the appended Claims.

The invention claimed is:

1. A braking system for a trailer vehicle which comprises:
an electro-pneumatic braking system provided in the trailer vehicle and including:
a control input for a control pressure the value of which is indicative of a desired braking pressure to be applied to braking elements of the vehicle;
a supply inlet for connection to a pressure source of the vehicle,
first and second outputs respectively for connection to the braking elements associated with the left and right side respectively of the vehicle;
first and second pneumatically controlled relay valves disposed between said supply inlet and said first and second outputs respectively, and having respective pneumatic control inputs;
first and second solenoid-operated on/off valves connected between the control input of first and second relay valves respectively, and a single, common pneumatic duct, and each operable, in a first and a second condition, respectively, to allow and prevent connection of the control input of the corresponding relay valve to said common pneumatic duct;
a first solenoid-operated switching valve having first and second conditions, respectively, in which it couples said common pneumatic duct to the control input and to an inlet/outlet aperture of a normally closed second solenoid-operated switching valve, respectively, said second solenoid-operated switching valve having first and second conditions respectively in which its inlet/outlet aperture is coupled to a discharge passage opening to the outside environment and to said supply inlet, respectively; and
an electronic control unit arranged to control said solenoid valves in accordance with predetermined modes of operation and operable selectively to obtain:
an increase in pressure applied to the control input of at least one relay valve by controlling said solenoid valves so as to achieve a first operating condition in which both solenoid-operated switching valves are in said second condition, while the solenoid-operated on/off valve, associated with the relay valve is in first condition; or
a controlled decrease in pressure applied to the control input of at least said relay valves by controlling said solenoid valves so as to adopt a second operating condition in which the first and second solenoid-operated switching valves are in their second and first conditions respectively, while the solenoid-operated on/off valve associated with said at least one relay valve is in said first condition.

2. A system according to claim 1, further comprising pressure sensor means for supplying said electronic control unit (ECU) with electrical signals indicating the value of the pressure at the control input, the supply inlet and the said first and second outputs of the system.

3. A system according to claim 2, in which additional sensor means are connected to the electronic control unit (ECU) for supplying electrical signals indicating the load condition of the vehicle.

* * * * *